United States Patent [19]

Shultz

[11] Patent Number: 4,563,716
[45] Date of Patent: Jan. 7, 1986

[54] RANDOM ACCESS DATA STORAGE SYSTEM

[75] Inventor: Frederick P. Shultz, Columbia, Md.

[73] Assignee: Debtec Corporation, Annandale, Va.

[21] Appl. No.: 477,504

[22] Filed: Mar. 21, 1983

[51] Int. Cl.$^4$ ............................................. G11B 15/68
[52] U.S. Cl. ....................................... 360/92; 360/96.3
[58] Field of Search ................... 360/92, 93, 90, 96.3, 360/130.31–130.33

[56] References Cited

U.S. PATENT DOCUMENTS

4,311,286   1/1982   Akino et al. ...................... 360/93 X

Primary Examiner—John H. Wolff
Attorney, Agent, or Firm—Brady, O'Boyle & Gates

[57] ABSTRACT

Random access peripheral data storage apparatus for use with microcomputers comprising a drive unit including a housing containing two separate selectively operated film transport mechanisms for respectively engaging and driving two endless loops of magnetic recording film separately contained in two identical and interchangeable cartridges of unique construction which are adapted to be manually loaded on the drive unit. The drive unit additionally includes a "flying" read/write head which moves back and forth laterally across respective access ports in the cartridges to selectively access either film, with the film being completely contained inside of the respective cartridges and being substantially inaccessible except for a read/write head access port. Each film transport mechanism, moreover, is comprised of an interconnected single drive sprocket, film tensioning mechanism, and a film hold down mechanism which are external to the respective cartridge housing and operate in synchronism to engage and disengage the film through respective other ports in the cartridge. Moreover, the drive sprocket for each cartridge is alternately powered from a single drive motor and is activated only when the read/write head is adjacent the respective cartridge.

41 Claims, 11 Drawing Figures

RANDOM ACCESS DATA STORAGE SYSTEM

BACKGROUND OF THE INVENTION

This invention relates generally to digital data storage apparatus and more particularly to random access digital data storage apparatus utilized in connection with digital computers.

While various types of digital data storage systems are known, currently only two types of systems are utilized for data storage in connection with small, so called microcomputers which are finding widespread use by individuals or small organizations having no need for large mainframe type computers. One type of data storage utilized with these relatively small but increasingly complex computers is cassette type storage. In such systems, random access is available only through an elaborate and extremely expensive process of high speed forward or reverse complete reel-to-reel tape transport coupled with high speed data pattern recognition. In all other medium to low cost cassette tape systems, the interface with the computer cannot provide random access at all. The second type of data storage apparatus finding widespread use is that of disc storage. Two forms of disc storage are commonly interfaced with such computer apparatus and comprise either hard disc storage or what is commonly known as "floppy" disc storage. While disc storage is adapted to provide random access to stored data, in order to achieve efficient random access data storage with protection back-up, two separate disc drives are normally interfaced with the computer by a single controller card. Due to the fact that each drive requires a separate erase/read/write head as well as one respective stepping motor and one respective analog drive motor, it can readily be seen that a pair of disc drives inherently involve a duplication of relatively expensive components and thus where cost becomes a primary consideration, there is an ever present need to provide an improved and yet inexpensive means of storing data which can either completely replace or operate in conjunction with prior art storage systems such as floppy disc type systems.

Accordingly, it is an object of the present invention to provide an improvement in digital data storage apparatus.

It is another object of the present invention to provide an improvement in random access data storage apparatus which is adapted to provide a relatively large storage capacity.

Still another object of the present invention is to provide a computer data storage system including a storage medium which offers maximum protection from handling and other forms of surface abuse.

And yet another object of the invention is to provide a random access data storage system which is relatively simple to operate and is readily usable with any digital computer where there is provided a control interface.

SUMMARY

Briefly, these and other objects are achieved in accordance with at least one but preferably a pair of magnetic recording film cartridges which are inserted in either side of a film drive unit which includes means to selectively position a stepper motor driven read/write head over an access port in the selected cartridge and enable a single analog drive motor to engage and selectively drive a sprocket wheel in duplicate transport mechanisms, one for each cartridge, which is adapted to engage a continuous loop of magnetic film in the respective cartridge, once the cartridge has been engaged in the drive unit by moving an actuator handle to the operate position.

Each cartridge, moreover, comprises a plastic container for a length of continuous magnetic film having a row of sprocket holes along each side as well as one or more reference holes selectively located in relation to the sprocket holes for identifying and locating a predetermined data sector of a plurality of data sectors along the length of the storage medium. Except for the film, the cartridge has no moving parts and is configured to have inner side surface portions which are structured to define a guide path for the film as well as a storage area and thus the film never leaves the confines of the cartridge and the user never touches the film.

In addition to a single drive sprocket, each transport mechanism includes film tensioning means for preventing film slackening or backlash as well as film hold down means located adjacent the drive sprocket for pressing against the film as the drive sprocket transports the film past the read/write head access port. The drive sprocket, film tensioning means, and hold down means, moreover, are mechanically linked together to provide synchronized engagement of and retraction from the film through other ports in the cartridge in response to movement of the actuator handle. Moreover, the drive sprocket for each cartridge is alternately driven by the same analog drive motor and is activated only when the read/write head is located in the vicinity of the film access port of that cartridge. Once at least one of the cartridges is in place on the drive unit, control of both the analog sprocket drive motor and the stepper motor for positioning the read/write head are under computer control through a controller interface, comprising, for example, a controller card located in a drive unit housing containing both transport mechanisms, the stepper motor, and the analog drive motor.

These and other objects will become readily apparent when the following detailed description of the invention is considered in conjunction with the accompanying drawings.

DETAILED DESCRIPTION OF THE INVENTION

Figures 1, 2, 4:
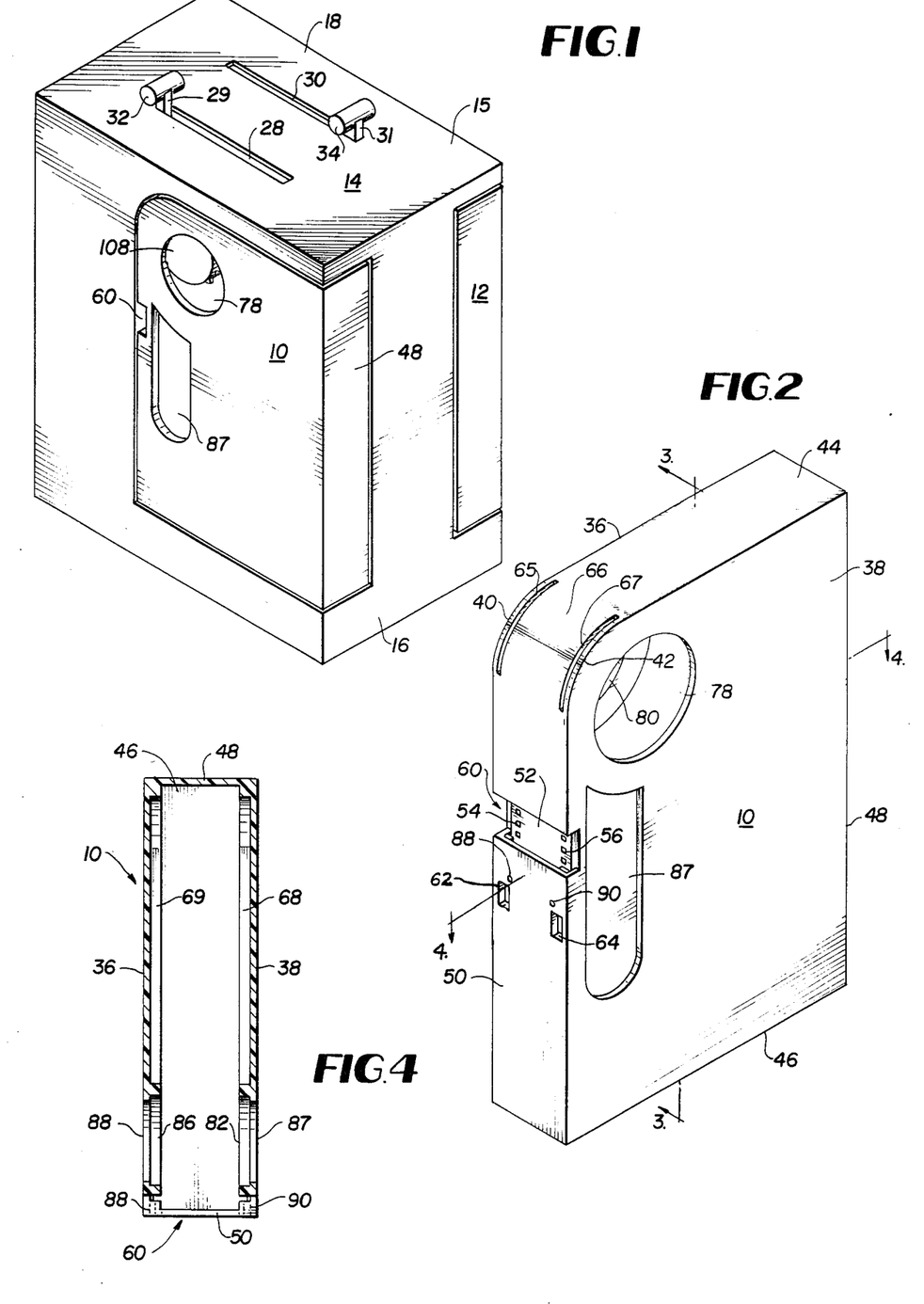
FIG. 1 is a perspective view generally illustrative of a pair of identical recording film cartridges in position on each side of a drive unit in accordance with the subject invention.
FIG. 2 is a perspective view illustrative of one of the cartridges shown in FIG. 1.
FIG. 4 is a lateral cross sectional view of the cartridge shown in FIG. 2 taken along the lines 4—4 thereof.

Referring now to the drawings, FIG. 1 discloses a pair of interchangeable cartridges 10 and 12 of identical construction which are shown located on each side of a drive unit 14. The drive unit 14 includes a housing 15 containing two separate and identical transport mechanisms, to be described, for operating a respective cartridge. Each cartridge 10 and 12, moreover, contains a continuous loop of an elongated magnetic storage medium such as magnetrc film or tape, which will also be further described subsequently. Reference numeral 16 denotes the front wall of the drive unit housing 15, while reference numeral 18 denotes the top wall thereof. Thus the cartridges 10 and 12 are loaded on the front forward side of the drive unit 14. The top wall 18 additionally discloses a pair of longitudinal slots 28 and 30 through which project a pair of actuator arms 29 and 31 terminating in handles 32 and 34 which may be selectively grasped and moved manually by an operator from front to back, which causes the transport mechanisms within the drive unit 14 to engage the recording medium contained in a particular cartridge for random access data storage and retrieval of data for use with a digital computer, not shown.

Referring now to FIG. 2, there the cartridge 10 of the two cartridges 10 and 12, shown in FIG. 1, is disclosed in detail and is shown comprising a container fabricated, for example, of rigid plastic. The cartridge 10 includes a pair of generally rectangular broad side walls 36 and 38, except for the rounded corner portions 40 and 42, as well as top and bottom walls 44 and 46 of relatively narrow width and like width front and rear walls 48 and 50. As shown in FIG. 1, when the cartridge 10 is in place on the drive unit, sliding it on from the side, the front wall 48 is coincident with the front wall 16 of the drive unit housing 15 and the rear wall 50 faces the interior of the housing.

The cartridge 10 contains a continuous loop 52 of magnetic recording film, typically 35 mm magnetic recording film, such as used in motion picture sound recording, and having a mylar base and a row of sprocket holes 54 and 56 located along each side or margin thereof. In operation, the endless loop of recording film 52 never leaves the confines of the cartridge but is either contained in a storage area 58, shown in FIG. 3, or is transported past a rectangular access port 60 formed transversely across the width of the rear wall 50. This port is adapted to allow a "flying" read/write head, to be described, to travel laterally, i.e. transversely, across the film face to store and retrieve digital data from a plurality of parallel longitudinally extending tracks, not shown.

Figures 3, 5:
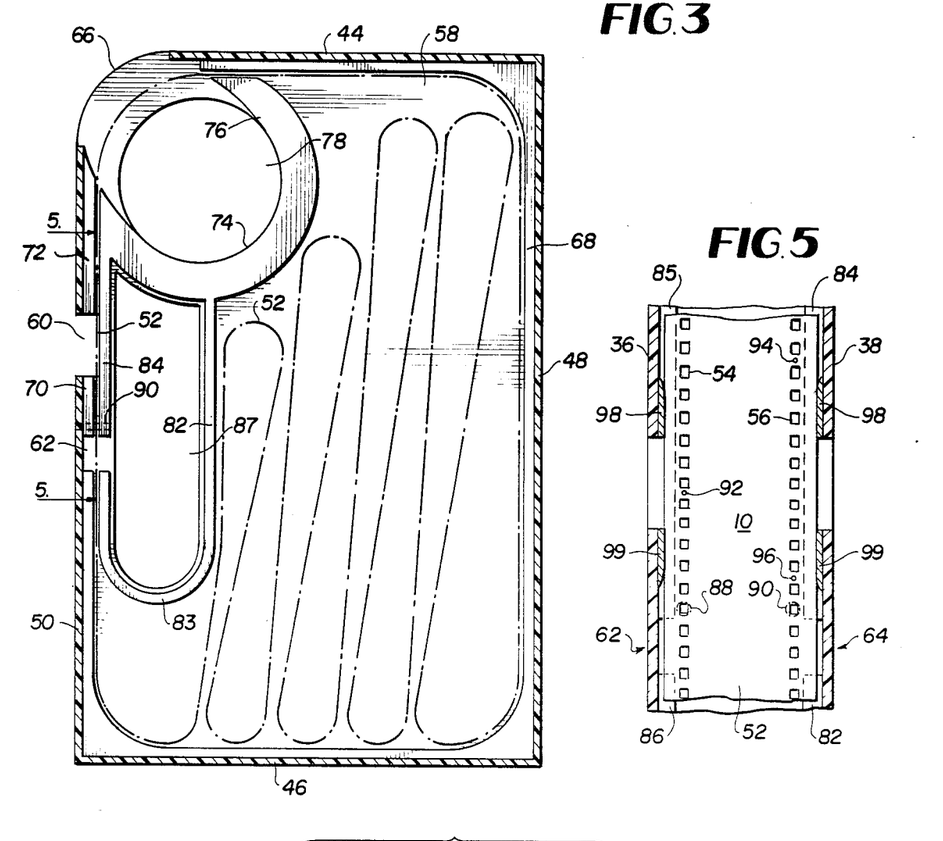
FIG. 3 is a central longitudinal cross section of the cartridge shown in FIG. 2 taken along the lines 3—3 thereof.
FIG. 5 is a partial sectional view of the cartridge as shown in FIG. 3 and taken along the lines 5—5 thereof.

As illustrated in FIGS. 3, 4 and 5, in order to guide the film 52 past the read/write head access port 60, past a pair of smaller rectangular ports 62 and 64 beneath the port 60, as well as past an upper drive region 66, adjacent a pair of slot type ports 65 and 67 along with entrance to and from the storage area 58, raised film guides are laminated to the inside surface of each side wall 36 and 38. The laminated guides are comprised of respective first members 68 and 69 (FIG. 4) which extend from the top wall 44 down past the front wall 48, the bottom wall 46 and partially up the rear wall 50 as shown in FIG. 3. A small pair of guide segments, one of which is shown in FIG. 3 by reference numeral 70, are located between the access port 60 and the ports 62 and 64. Also, a pair of relatively longer guide segments, one of which is shown by reference numeral 72 in FIG. 3, are located between the port 60 and the drive region 66. An inner guide member, one of which is shown in FIG. 3 by reference numeral 74 is additionally formed on the inner portions of walls 36 and 38. The inner guide 74 shown in FIG. 3 includes a circular segment 7 partially surrounding one port 78 of a pair of opposing circular ports 78 and 80 formed in an upper corner portion of the side walls 38 and 36 and which are adapted to selectively receive a film drive sprocket of a film transport mechanism to be described, so as to engage the film 52 in the region 66. The inner guide member 74, for example, additionally includes a depending element 82 which has a curved lower end portion 83 which terminates at the ports 62 and 64. An identical configuration including segments 85 and 86 are shown in FIG. 5. The segments 82 and 84 as well as a portion of the circular segment 76 lie along an elongated port 87 of a pair of identical ports 87 and 88 located respectively in the side walls 38 and 36, which ports are adapted to receive tensioning means as well as photodiode and light receptor means, not shown, and which are coupled via a pair of small circular ports 88 and 90 which form thereby two radiant signal paths on either side of the film 52 for counting the sprocket holes 54 and 56 as well as one or more reference holes 92, 94 and 96, shown in FIG. 5. The purpose of these signal paths is for determining a starting position of the film loop and starting positions of a predetermined data sector of a plurality of data sectors located along the length of the film loop 52.

The cartridge 10 has no moving parts, springs, etc. except for the endless loop of film 52 itself. Accordingly, an operator never touches the film and thus it is not subject to finger prints and surface scratches. The cartridges 10 and 12 are not an integral part of the drive unit 14 but rather interchangeable housings for continuous loops of recording medium. Once inserted in the drive unit 14, however, the cartridges are engaged by a respective transport mechanism including film tensioning and hold down means to be described.

FIG. 5 is additionally intended to shown that the width of the cartridges, for example, the width of cartridge 10 is slightly wider from side to side than the width of the film 52, thus preventing the film from twisting or tangling or binding against the cartridge side walls 36 and 38; however, in the region of the read/write head access port 60, the film 52 is restrained by opposing pairs of shims 98 on the upper part of the port 60 and lower pair of shims 99 on the lower part of the port 60 so as to prevent any lateral movement of the film 52 as it passes the access port 60 and thereby eliminate any possible registration errors which might occur between recording tracks and the position of a read/write head positioned at the access port 60.

As designed, either cartridge 10 or 12 may be inserted in the left or right side of the drive unit 14 whereupon dual transport mechanisms each including a drive sprocket, film tensioning means and film hold down means, now to be described, selectively engage the respective recording film contained therein in a coordinated sequence and a read/write drive head is brought into position to access the film at the access port. Also one of the drive sprockets is enabled to receive power from a common drive motor.

Figure 6:
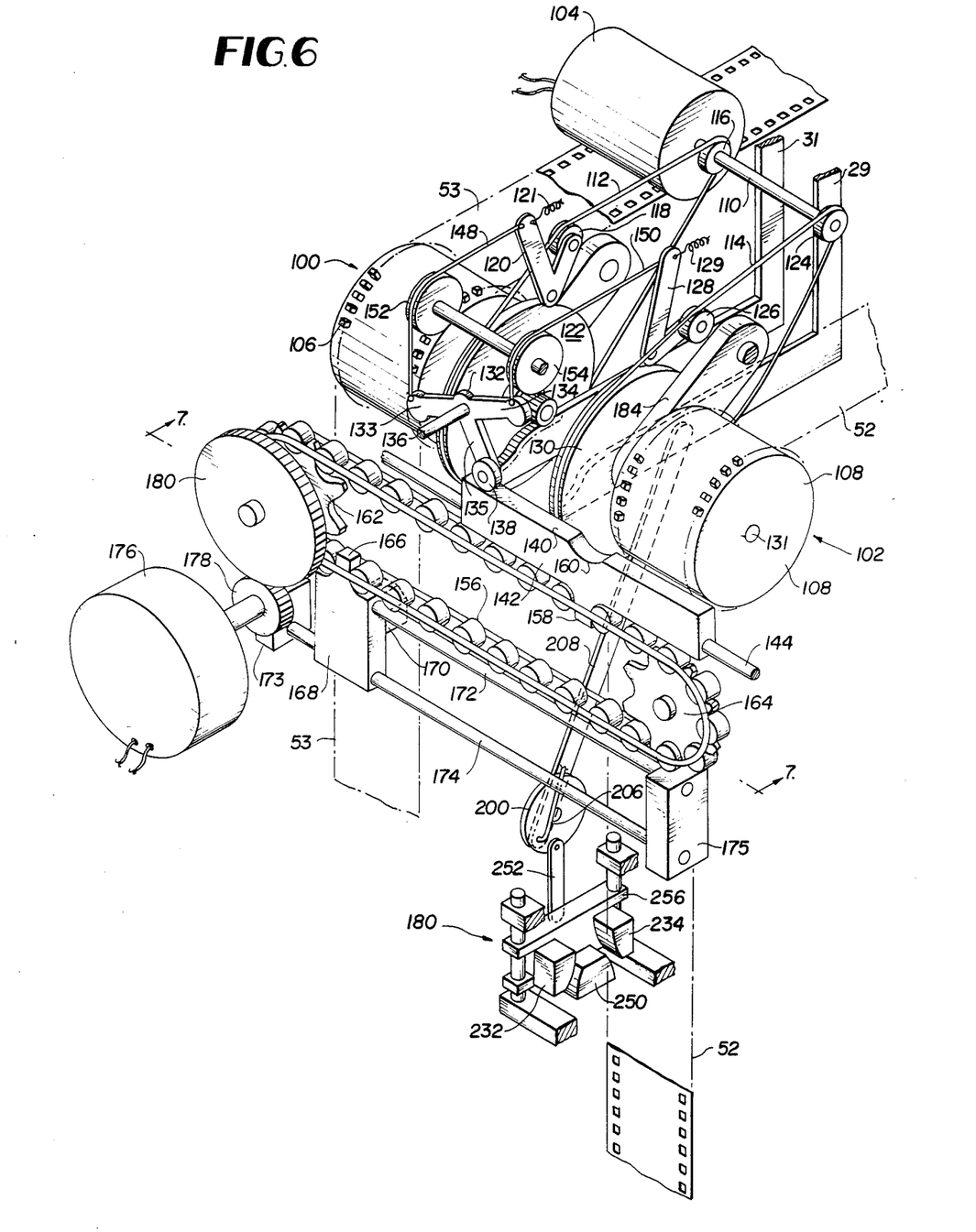
FIG. 6 is a perspective view partially illustrative of two film transport mechanisms and read/write head positioning mechanism contained in the drive unit of FIG. 1.

Referring now to FIGS. 6 through 11, and now more particularly to FIG. 6, reference numerals 100 and 102 generally designate duplicate film transport mechanisms located near the rear of the drive unit housing 15 (FIG. 1) and which are respectively operable to transport separate continuous loops of film 52 and 53 located, for example, in the cartridges 10 and 12, provided both are in place on the drive unit 14 at the same time. Further, as shown in FIG. 6, cartridge 12 can be engaged by the transport mechanism 100 on the right while the cartridge 10 can be engaged by the transport mechanism 102 on the left. There is no need to have both cartridges installed on the drive unit 14 simultaneously to function because the transport mechanisms 100 and 102 operate independently while being alternately powered from a common analog drive motor 104.

The transport mechanisms 100 and 102 include respective sprocket wheels 106 and 108 which are coupled to the shaft 110 of the motor 104 by drive belts 112 and 114 which are selectively tensioned. Power from the motor 104 is transmitted to the sprocket wheel 106 by way of the belt 112 which contacts a flanged pulley 116 on the shaft 110, a flanged idler pulley 118 located on a pivoted angulated lever arm member 120 connected to a tension spring 121 and an unflanged fly wheel 122 coupled to the sprocket shaft 123. Corresponding like elements 124, 126, 128, 129, 130 and 131 couple the drive motor 104 to the sprocket wheel 108 on the left. When the motor 104 is operating, flanged pulley 118 which is shown in an engaged position in FIG. 6, exerts sufficient force on the belt 112 to cause it to rotate fly wheel 122, thus causing the sprocket 106 to rotate. The flanged idler pulley 126 associated with the drive belt 114 for the left side sprocket wheel 108 is in an unengaged position when the idler pulley 118 is in the engaged position and vice versa.

The engaged position of the drive belts 112 and 114 is determined by one of two rotational states of a bell crank or T-bar member 132 comprised of arms 133, 134 and a downward oriented segment 135. The member 132 is adapted to rotate about a pivot 136 in response to the movement of a roller 138 located on the end of segment 135 and which is adapted to ride on the upper cam surface 140 of a cam block 142 which slides laterally along a bar 144. The arms 133 and 134 respectfully attach to cable members 148 and 150, which pass over a pair of pulleys 152 and 154 and couple to the ends of the pivoted crank members 120 and 128. Accordingly, which of the sprocket wheels 106 or 108 is driven by the drive motor 104 depends upon which idler pulley 118 or 126 is exerting pressure on the respective belt 112 and 114 due to the toggled position of the T-bar member 132.

Figure 7:
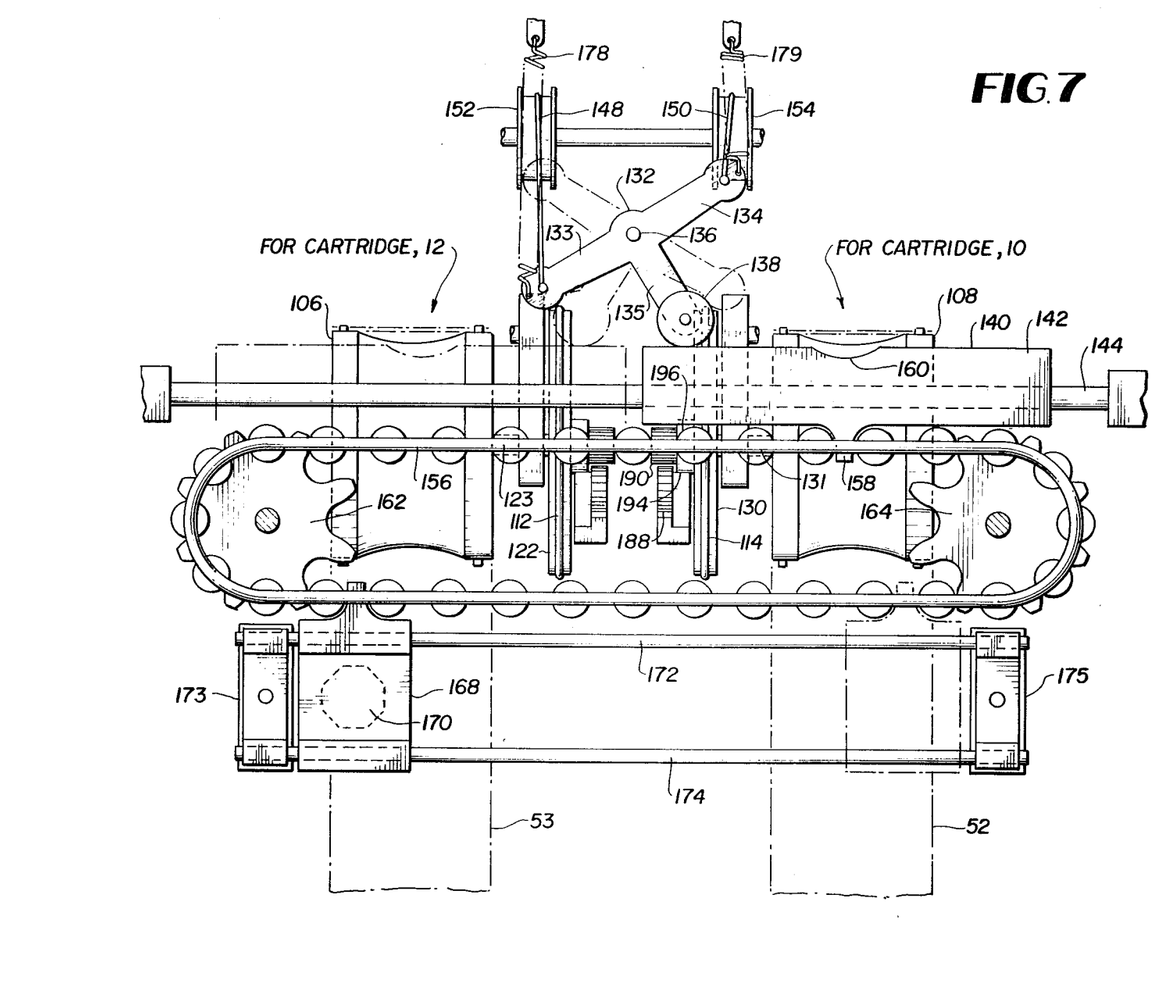
FIG. 7 is a sectional view of the apparatus shown in FIG. 6 taken along the lines 7—7 thereof.

As illustrated in FIGS. 6 and 7, the cam block 142 is coupled to a well known anti-backlash drive belt or chain 156 by means of a downwardly projecting finger 158 which resides beneath the location of a concave cam surface region 160 in the cam surface 140. The drive chain 156 passes around sprockets 162 and 164 where it engages another finger projection 166 of a read/write head mount 168 on which is located a conventional magnetic erase/read/write head 170 and which is adapted to slide laterally and transversely across the face of either film 52 or 53 by means of a pair of parallel rods 172 and 174 supported by bearing blocks 173 and 175. Positioning the read/write head 170 over selected tracks on either film 52 or 53 or "flying" the head from one film to the other, is accomplished by means of a stepper motor 176 coupled to the drive chain 156 by means of a pair of circular gears 178 and 180.

Thus as shown in FIG. 6, when the head block 168 and the read/write head 170 are positioned to operate in connection with the film 53 located in the cartridge 12 on the right side of the assembly (FIG. 1), the cam block 142 which slides on the rod 144 and is engaged by finger 158 in the upper part of the drive chain 156, is on the left side of the assembly. In such a position, the T-bar member 132 has rotated clockwise against the action of a tension spring 178, as shown in FIG. 7, to pull the cable 148 attached to the pivoted member 120 such that the idler pulley 118 is forced up against the belt 112 and thus apply power to the sprocket wheel 106.

In the event that the read/write head block 168 is to be moved laterally to the left to access the film 52 in the cartridge 10, the stepper motor 176 is driven in response to commands received through computer interface circuitry, not shown, but located in the drive unit housing 15. The head block movement imparted thereto through the anti-backlash chain 156 causes the cam block 142 to move to the right and in so doing, the roller 138 which rides on the upper cam surface 140 of the cam block 142 enters the concave surface depression 160. At this point, the tension spring 178 attached to the arm 133 rotates the T-bar member 132 counterclockwise. This movement causes the lever 120 to be pulled forward by action of the spring 121, shown in FIG. 6, causing the idler pulley 118 to move downwardly, at which time the drive belt 112 goes slack thereby causing the sprocket wheel 106 to become inactive.

Further movement of the cam block 142 to the right causes the roller member 138 on the T-bar member 132 to come out of the surface depression 160 onto the flat left hand portion of the cam surface 140, at which time the left arm 134 of the T-bar member 132 is caused to move downwardly against the tension spring 179. This pulls the pivoted lever arm 128 against the bias spring 129 which causes the idler pulley 126 to rise as illustrated in FIG. 9 and thus tension the drive belt 114 to activate the sprocket wheel 108, causing the recording film 52 in the cassette 10 shown in FIG. 1 to be driven by the motor 104.

This mechanism permits the one drive motor 104 to power both sprocket wheels 106 and 108 selectively so that only the recording film currently accessed by the read/write head 170 will be powered by the belt drives. In addition this same mechanism which positions the read/write head 170 also selects and activates the related film drive. Moreover, read/write head movement within the boundaries of a currently selected film cartridge has no effect on the sprocket wheel drive belt tension. Only a total shift in position of the read/write head 170 from the area of one film cartridge to the area of the other cartridge can cause a shift in tension on the engagement lever member 120 and 128 containing the idler pulleys 118 and 126.

Up to this point, consideration has been given primarily to the means for imparting drive power to the sprocket wheels 106 and 108. Of major importance, however, is a feature, now to be described, which enables each of the sprocket wheels 106 and 108 external to the respective cartridges 12 and 10 to engage the recording film 52 and 53 contained in the cartridges without manual handling of the film and without any part of the film loop ever leaving the confines of its cartridge. The difficulty in mechanically engaging sprocketed film in such a film transport mechanism is that the sprockets of the drive wheel must enter the sprocket holes of the film while at the same time hold down means in the form of rollers or curved glides must be placed against the other side of the film adjacent to the sprockets with sufficient force to keep the film from riding up over the sprocket. Additionally, if the sprockets of the drive wheel make direct contact with the film in the area between the sprocket holes and are forced against the film by the retainer on the other side, the sprockets can punch through and/or distort the film. The present invention prevents damage to the film by causing the sprocket wheel, for example, sprocket wheel 108 to turn as it makes contact with the film 52. Should it contact the film 52 in an area between the sprocket holes 54 and 56 (FIG. 5), it will do so with a turning movement which will cause the sprocket to glide into the next available sprocket holes of the film just as hold down means are making contact on the other side of the film 52.

Figures 8, 11:
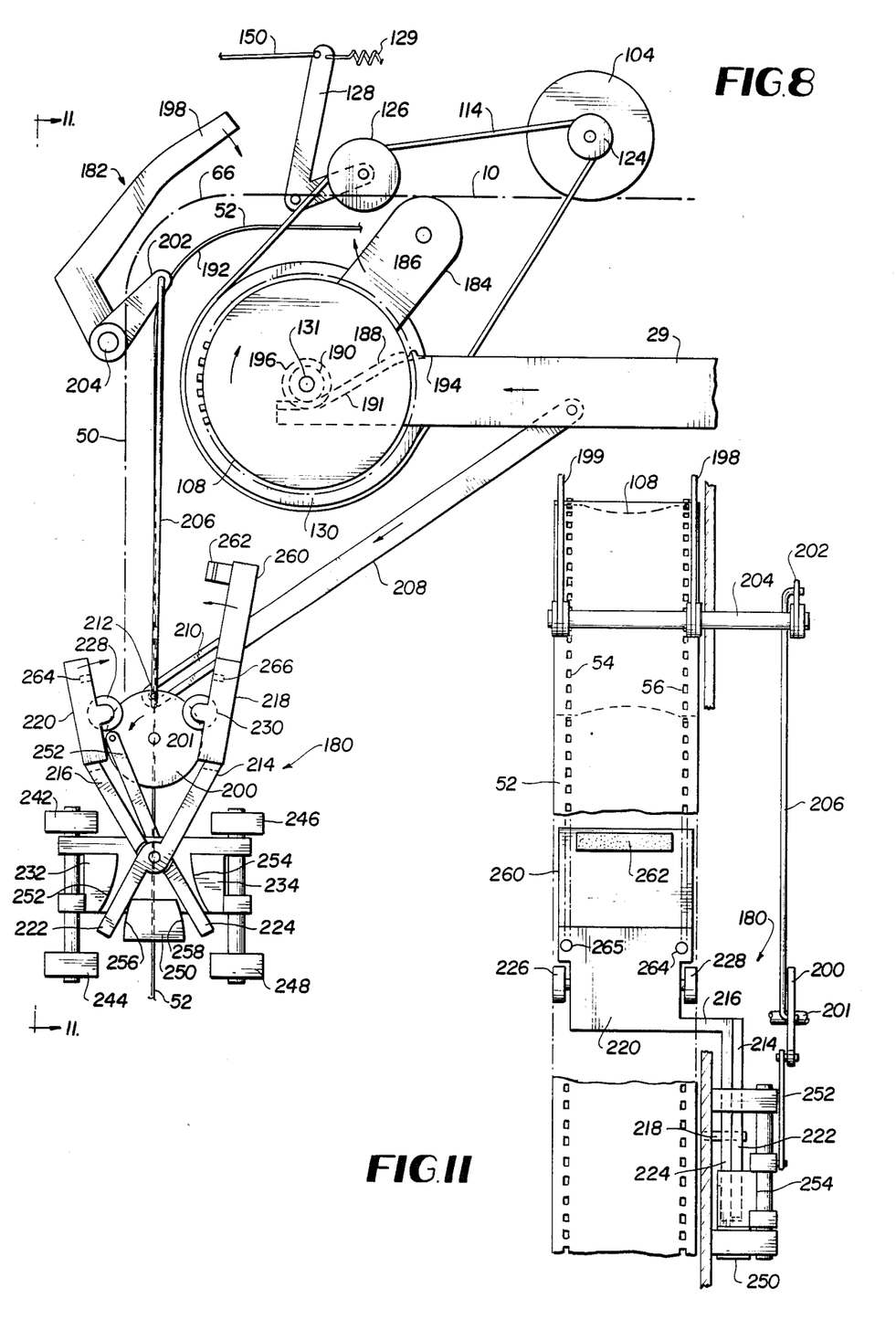
FIG. 8 is a fragmentary side elevational view with parts removed and being further illustrative of the transport mechanisms shown in FIG. 6 in a first operational mode.
FIG. 11 is a sectional view of the transport mechanism illustrated in FIG. 9 and being taken along the lines 11—11 thereof.
Figure 9:
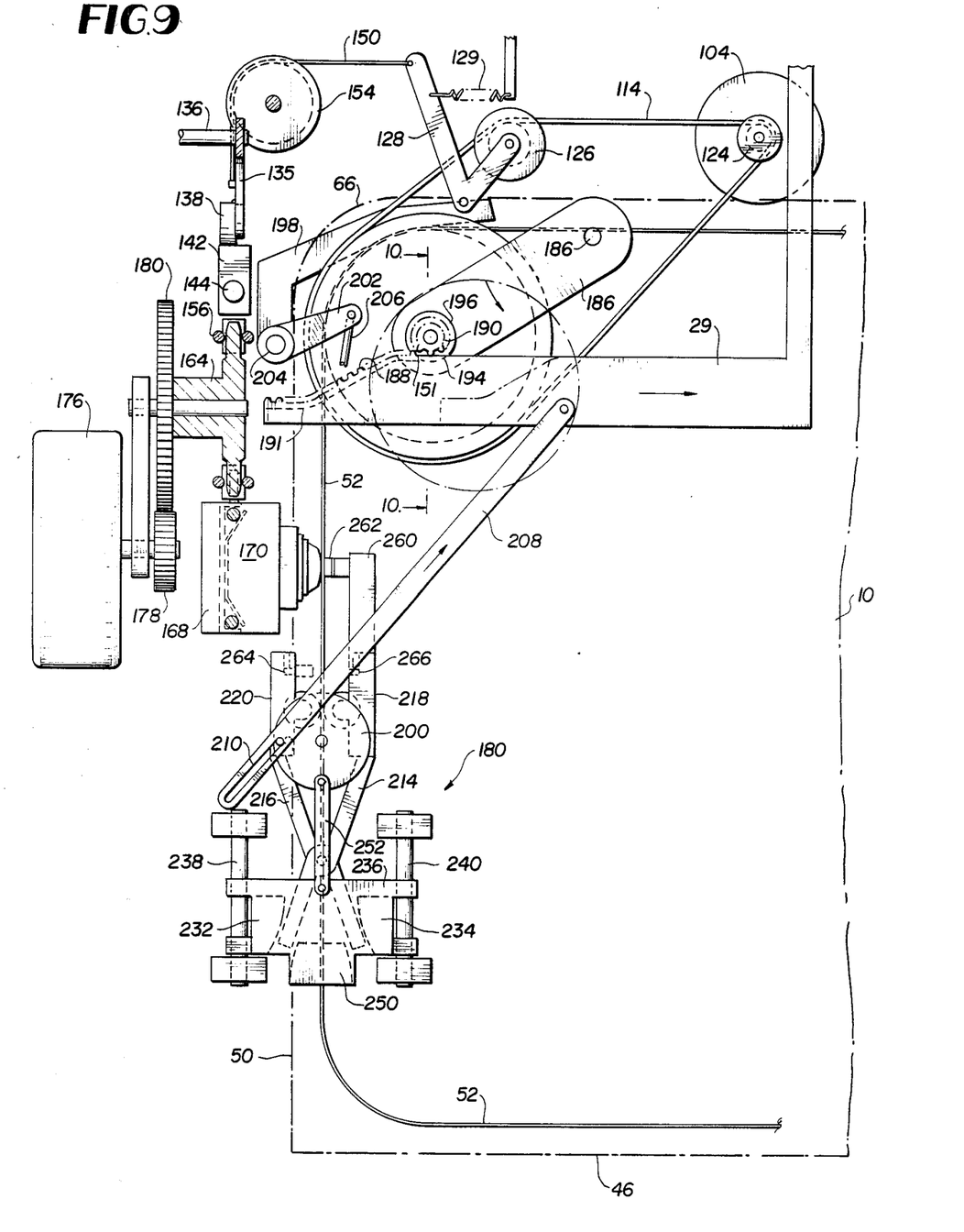
FIG. 9 is another fragmentary side elevational view further illustrative of apparatus shown in FIG. 6 in a second operational mode.

To this end, reference is now made primarily to FIGS. 8 and 9. In FIG. 8, the sprocket wheel 108 for driving the film 52 contained in cartridge 10 is shown in a first or retracted position, which position is its position relative to the cartridge 10 at the time it is initially loaded and placed in position on the drive unit 14 and the handle 32 located at the end of the actuator arm 29 has been pulled towards the front wall 16 of the drive unit. Thus positioned, the sprocket wheel 108 lines up with the circular ports 78 and 80 (FIG. 2) whereupon the cartridge can be inserted into place so that the sprocket wheel now resides within the cartridge ports but out of contact with the film 52. At the same time, the tensioning mechanism shown generally by reference numeral 180 and which will be described subsequently, is adapted to pass through one of the vertically oriented elongated ports 78 and 88. At the same time, a film hold down mechanism, shown by reference numeral 182 is out of the way so that it does not strike the rounded corners 40 and 42 of the cartridge.

Referring now back to the drive sprocket wheel 108, its shaft 131 rotates in a bore or bearing in one end of an arm 184 whose other end is connected to a pivot 186 and thus the sprocket wheel 108 is adapted to swing about the radius distance between the shaft 131 and the pivot 186. An identical arrangement is provided for the other sprocket wheel 106 as shown in FIG. 6. Further as shown in FIG. 8, the actuator arm 29 connected to handle 32 of FIG. 1 includes and terminates in an inclined curved rack 188 which meshes with a pinion gear 190 located on the shaft 131. Accordingly, a motion of the actuator 29 shown by the arrow of FIG. 8 toward the rear wall 50 will cause the pinion gear 190 to ride up the inclined rack 188 which imparts the aforementioned turning motion to the sprocket wheel 108 which at the same time is swung upwardly by interaction of a collar 196 mounted on the shaft 131 with a cam surface 191 integral with actuator arm 29 to engage the film 52 at the region 192 of the film. Additionally, the cam surface 191 includes an inner ledge 194, further shown in FIGS. 7 and 10, which is adapted to engage the collar 196 such that when contact with the film is securely made, the rack gear 188 drops below the point of contact with the teeth of the pinion gear 190 at point 151 (FIG. 9) thus allowing the sprocketed drive wheel 108 to rotate only under belt driven power imparted thereto by the belt 114 without interference from the rack and pinion assembly. This action is clearly illustrated in FIG. 10 where the drive sprocket 106 is raised relative to the sprocket 108 and the collar 197 of the sprocket 106 rides on the ledge 195 and as a result the pinion 191 is out of control with the rack 187.

Simultaneously with the engagement of sprocket wheel 108 with the film 52, a pair of film hold down claws 198 and 199(FIG. 11), one of which is shown in FIG. 8 i.e. claw 198 is adapted to pivot downwardly through the curved ports 65 and 67 (FIG. 2) of the cartridge 10, to engage the outside edges of the film 52 adjacent the sprocket holes 54 and 56. This is further shown by the elements 198 and 199 in FIG. 11. This movement is provided by means of a circular linking element 200, shown in FIG. 8, which couples a rotatable crank 202, connected to the claw 198 which is pivoted at 204, to the actuator arm 29 by means of the vertically descending connecting rod 206 and an inclined link 208. The link also includes an elongated slot 210 at the end connected to the circular linking element 200. In operation, a movement of the actuator arm 29 in the direction shown by the arrow in FIG. 8, causes movement of the link 208 toward circular member 200; however, the slot 210 prevents its making contact with a link pin 212 until the correct moment in the engagement process occurs, at which point link 208 pushes pin 212 down and to the left causing circular linking element 200 to rotate counterclockwise. The connecting rod 206 is attached to the left of center above the pivot point of link element 200 and is pulled downwardly as the element rotates counterclockwise and a synchronized contact with the film 52 is made by the claws 198 and 199 which rotate as shown.

Concurrently with engagement of the film 52 by the sprocket wheel 108 and the claws 198, the film tensioning means 180 which is further illustrated in FIG. 11, includes a pair of scissor elements 214 and 216 which are connected by a pivot pin 218. The upper portions of the scissor elements 214 and 216 include respective offset block members 218 and 220 and lower finger portions 222 and 224. The upper block member 220 contains a pair of rollers 226 and 228, shown in FIG. 11, which are adapted to pass through the cartridge ports 62 and 64, shown in FIG. 2, from the outside of the cartridge while the block 218 contains a like pair of rollers, one of which is shown by reference numeral 230 in FIG. 8. These opposing pairs of rollers are adapted to come together as shown in FIG. 9, when the finger portions 222 and 224 of the scissor elements 214 and 216 are pushed together by means of a pair of opposing cam members 232 and 234 located on a support block 236 which is slidably mounted on two rails 238 and 240 supported by bearing blocks 242, 244, 246, and 248. Additionally, the cam support block 236 includes a third cam member 250 which counters the effect of cams 232 and 234 when the engagement action, to be described, is reversed for disengagement. Further, as shown, a linear connecting link 252 is coupled between the cam support block 236 and the circular linking element 200.

In operation, rotation of the circular linking element 200 by the connecting link 208 causes the cam block 236 to be moved downwardly, whereupon finger elements 222 and 224 are pushed together by the cammed surfaces 252 and 254. This causes the upper elements 218 and 220 to be moved together. A reverse or upward motion of the cam block 236 causes the surfaces 256 and 258 of cam 250 to engage the finger elements 222 and 224, spreading them apart to the position shown in FIG. 8.

Additionally, the inner support block 218 connected to the scissor element 214 includes an extension 260 to which is affixed a generally rectangular pressure pad 262 which is adapted to hold the film 52 in contact with the read/write head 170 as shown in FIG. 9. Also, the two blocks 218 and 220, respectively connected to the scissor elements 214 and 216 are adapted to provide support for opposing pairs of light emitters and sensors which are shown and outlined by reference numerals 264 and 266 as shown in FIGS. 8 and 9 and which are brought into alignment with the small circular ports 88 and 90 located in the rear wall 50 as shown in FIG. 2 when the scissor elements are closed, for counting the sprocket holes 54 and 56 as well as the reference holes 92, 94 and 96 as shown in FIG. 5.

Figure 10:
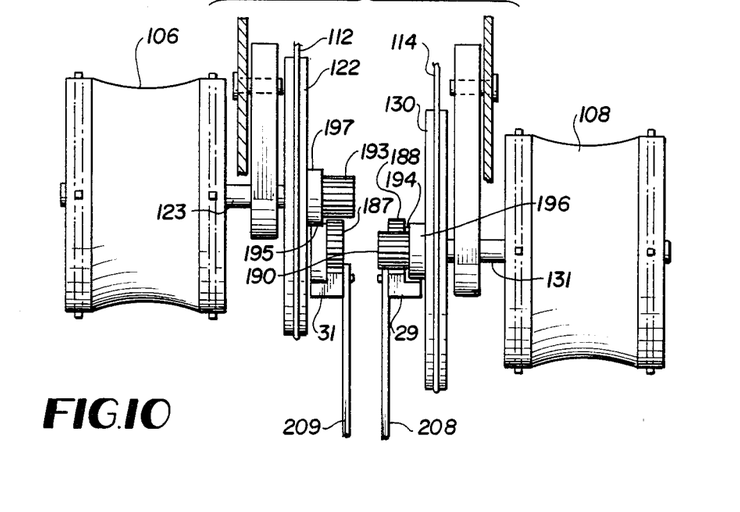
FIG. 10 is a partial sectional view of the transport mechanisms of FIG. 6 taken along the lines 10—10 of FIG. 9.

In summation, when at least one but normally two of the cartridges 10 and 12 are loaded onto the drive unit 14 shown in FIG. 1, the respective drive sprockets 106 or 108 are retracted, as well as a corresponding tensioning mechanism hold down mechanisms shown, for example, by reference numerals 180 and 182 in FIG. 8. With a normal rearward movement of the appropriate handle 32 and/or 34 towards the rear of the drive unit housing 15, the respective actuator arms 29 and 31 move to initiate an engagement process whereby synchronized contact between the film 52 and 53 contained in the cartridges 10 and 12 is respectively made by the sprocket wheel 108 and 106 swinging up into engagement therewith. The sprocket wheels are turned by virtue of the associated inclined rack and pinion mechanisms as illustrated in FIG. 10 as well as a closure of respective scissor elements shown in FIGS. 8 and 9 which forces opposing rollers against the film, thus retarding forward motion of the particular film sufficiently to provide tension between the rollers and the forward force point of the sprocketed drive wheel, thereby preventing slop or backlash in the respective film as it passes the read/write head port of the cartridge. This is also accompanied by a downward movement of the claws to the outer edges of the films which holds the film against the drive sprocket. When the respective handle is moved in the opposite direction, each of the aforementioned engagement functions is reversed to disengage the film and the scissor elements containing the pressure rolls move apart. Once engaged, the apparatus thus described functions under computer control with the drive motor 104 and the stepper motor 176 being coupled thereto through an interface circuit compatible with computer apparatus with which the subject invention is utilized; however, the drive motor 104 only couples power to one of the drive sprockets 108 and 106 depending upon the position of the read/write head 170 driven by the stepper motor 176.

Read/write operations are accomplished in a pattern of tracks which run parallel to the edges of the recording film 52 and 53 contained in the respective cassettes 10 and 12. The number of tracks is software dependent and instructions from the computer, not shown, positions the single read/write head 170 over the selected track by moving it from side to side transversely across the face of the film by movement of the head block 168 by means of the drive chain 156. As the film is transported past the read/write head 170 by the appropriate film transport mechanism, the sector counter keeps track of its position along the length of the film moved by counting the sprocket holes 54 and 56 and additional holes punched or drilled into the film between selected sprocket holes as previously described. Various patterns can be used, one example being a single extra hole 92 as shown in FIG. 5 between the sprocket holes 54 in the right margin which would register an unbalanced count biased to the right, marking the start of the loop. A single extra sprocket hole 94, for example, in the left margin between the sprocket holes 56 would register an unbalanced count biased to the left, making the start of a sector. Other patterns are possible based upon the frequency of sprocket holes passing the counter and clusters of drilled holes.

As is well known, a floppy disc type of storage device is configured to have about 35 tracks which are typically divided into 16 sectors which are identified by a volume number or number which is stored in the first sector of the center track, i.e. track 17. The remainder of track 17 contains a catalog of the stored data. The recording film 52 and 53 in each cartridge 10 and 12 of the subject invention can, when desirable, have more than one volume on a single loop of recording film. The number of volumes will depend upon the length of the film and the speed of transport for optimum read/write data quality. Assuming, for example, a three foot loop of film 52 being contained within the cartridge 10, a six volume capacity could be realized. The computer with which it is connected, however, will recognize only one volume at a time. Therefore, when accessing the film via the read/write head 170, it will search track 17 until it finds a volume name or number match. If, for example, the computer is looking for volume number 1, it will read track 17 until it finds the value 1. From that moment on it will know the location of sector 1, track 17 of volume number 1. Since there are six volumes on the film with sixteen sectors each, the computer will skip 16 sectors to find sector 2 of volume 1. Following access of sector 2 of volume 1, it will skip another 16 sectors and locate sector 3 of volume 1. Thus to access any other sectors not associated with volume number 1, the computer would have to be instructed to locate the appropriate volume. In an actual configuration, sectors and volumes would be interleaved in any of a number of irregular patterns which are software dependent.

A disc drive, moreover, can access only one disc volume at a time and switching volume numbers requires replacing the current disc with a disc matching the newly selected volume number. Typically, six or more volumes can be on line and accessible in each of the two cartridges contained in the drive unit 14 without replacing the cartridge. Alternating volumes and sectors allows the head time to move from one track to another before the next sequentially numbered sector of a current volume is presented to it.

Thus what has been shown and described is a random access system of a relatively low cost which is adapted to be used with microcomputers normally interfacing, for example, with floppy disc storage apparatus and which comprises a drive unit including a housing containing two separate selectively operated film transport mechanisms for respectively engaging and driving an endless loop of magnetic recording film contained in two identical cartridges which are adapted to be manually loaded on the drive unit from either side. The drive unit additionally includes a "flying" read/write head which is adapted to move back and forth laterally across respective access ports in the cartridges to selectively access either film, with the film being completely contained inside of the respective cartridges and being inaccessible except for being transported past its read/write head access port. Each film transport, moreover, is comprised of an interconnected single drive sprocket, film tensioning mechanism and a film hold down mechanism which are external to the respective cartridge housing and operate in synchronism to engage and disengage the film through ports in the cartridge. Moreover, the drive sprocket for each cartridge is alternately powered from a single drive motor and is activated only when the read/write head is adjacent the respective cartridge.

Having thus shown and described what is at present considered to be the preferred embodiment of the invention, it should be understood that the foregoing detailed description has been made by way of illustration and not limitation. Accordingly, all modifications, alterations and changes coming within the spirit and scope of the invention as defined in the claims annexed to this specification are herein meant to be included.

I claim:

1. Recording medium container and transport apparatus for a random access data storage system, comprising in combination:

at least one cartridge including a continuous length of elongated data storage medium contained therein, said length of storage medium having a row of sprocket holes along each side thereof, as well as one or more reference holes selectively located in relation to said sprocket holes, said cartridge further having a pair of relatively large opposing side walls and a plurality of relatively smaller intermediate end walls, at least one of said side walls having a first port for receiving drive means therein for transporting said storage medium within said cartridge, a second port in said one side wall for receiving at least signalling means therein for counting sprocket holes and said reference holes in said storage medium, both said cartridge side walls having raised inner side surface portions being structured to define a guide path for said storage medium along the inner surface of one of said end walls as well as an enclosed storage area for said storage medium, said one end wall having a third port for accessing a portion of said storage medium in said guide path by an external selectively positioned read/write head, and at least one fourth port located in said end wall for providing a signal path for said signalling means; and a drive unit engageable with said at least one cartridge for selectively driving and transporting said continuous length of storage medium linearly past a read/write head when in engagement with said cartridge, said drive unit comprising a housing containing at least one transport mechanism including actuator means, motor driven drive sprocket means comprising a single drive sprocket locatable in the first recited port of said at least one side wall of said cartridge, said drive sprocket being additionally movable by said actuator means and including means to engage said storage medium with a forward rotational movement for preventing damage to said storage medium when contact is initially made therewith, signalling means locatable at said at least one fourth port for counting said sprocket holes and said one or more reference holes in said storage medium for determining a predetermined data sector of a plurality of data sectors along the length of said storage medium, a read/write head and a drive motor thereafter located in said housing adjacent said third port and including means for selectively moving said read/write head on command transversely back and forth across said medium, and motor means for driving said drive sprocket when said read/write head is located adjacent said third port of said cartridge.

2. The apparatus as defined by claim 1 wherein said continuous length of elongated magnetic storage medium comprises an endless loop of magnetic recording material.

3. The apparatus as defined by claim 1 wherein said storage medium comprises an endless loop of magnetic recording film.

4. The apparatus as defined by claim 1 wherein said signalling means comprises radiant energy signalling means and said still another port in said end wall defines a radiant energy signalling path.

5. Recording medium container and transport apparatus for a random access data storage system, comprising in combination:

at least one cartridge including a continuous length of elongated magnetic storage medium contained therein, said length of storage medium having a row of sprocket holes along each side thereof, as well as one or more reference holes selectively located in relation to said sprocket holes, said cartridge further having a pair of relatively large opposing side walls and a plurality of relatively smaller intermediate end walls, at least one of said side walls having a first port for receiving drive means therein for transporting said storage medium and at least one second port for receiving storage medium tensioning means therein, both said cartridge side walls having raised inner side surface portions being constructed to define a guide path for said storage medium along the inner surface of one of said end walls as well as an enclosed storage area for said storage medium, said one end wall having a third port for accessing a portion of said storage medium in said guide path by a selectively positioned read/write head, at least one fourth port located in said end wall for providing a signal path for counting said sprocket holes and said one or more reference holes in said storage medium, at least one fifth port in said end wall for receiving said tensioning means, and at least one elongated slot in said one end wall in relatively close proximity to said first port for receiving hold down means for said storage medium at the location of said drive means;

a drive unit engageable with said at least one cartridge for selectively driving and transporting said continuous length of storage medium linearly past a read/write head when in engagement with said cartridge, said drive unit comprising a housing containing at least one transport mechanism including actuator means, motor driven drive sprocket means comprising a single drive sprocket locatable in said first port of said at least one side wall of said cartridge, said drive sprocket being additionally movable by said actuator means and including means to engage said storage medium with a forward rotational movement for preventing damage to said storage medium when contact is initially made therewith, tensioning means locatable in said at least one second port and being operable by said actuator means to engage and tension said storage medium through said fifth port of the cartridge in synchronism with the engagement of said drive sprocket with said storage medium, storage medium hold down means locatable adjacent said at least one elongated slot and being operable by said actuator means to contact and hold said storage medium against said drive sprocket through said slot and being operated in synchronism with the engagement of said drive sprocket with said storage medium, signalling means located in proximity to said at least one fourth port for counting said sprocket holes and said one or more reference holes in said storage medium for determining a predetermined data sector of a plurality of data sectors along the length of said storage medium, a read/write head located in said housing and being positionable adjacent said third port and including means for selectively moving said read/write head on command transversely back and forth across said medium, and motor means for driving said drive sprocket when said read/write head is positioned adjacent said third port.

6. The apparatus as defined by claim 5 wherein said continuous length of elongated magnetic storage medium comprises an endless loop of magnetic recording material.

7. The apparatus as defined by claim 5 wherein said storage medium comprises an endless loop of recording film.

8. The apparatus as defined by claim 5 wherein said magnetic storage medium comprises a continuous loop of 35 millimeter magnetic recording film.

9. The apparatus as defined by claim 5 wherein said side walls of said at least one cartridge both include said first and said second ports which respectively oppose each other whereby said cartridge can selectively engage said drive mechanism of said drive unit from either side direction.

10. The apparatus as defined by claim 9 wherein said one end wall includes two of said fifth ports located in mutual registration with one another at the outer edge of said one end wall for receiving said tensioning means.

11. The apparatus as defined by claim 10 wherein said intermediate end walls comprises a pair of front and rear walls and a pair of top and bottom walls, wherein said one end wall comprises the rear wall thereof and including a curved intermediate corner wall portion between said top wall and said rear wall, said first port in said walls being generally circular in configuration and located adjacent said curved corner wall portion, and wherein said at least one elongated slot comprises a pair of elongated slots at the outer edge of corner wall portion and being adapted to receive said hold down means therein for contacting said storage medium at the outer sides thereof in the vicinity of said sprocket holes.

12. The apparatus as defined by claim 11 wherein said at least one fourth port located in said one end wall comprises a pair of fourth ports located at the outer edge of said rear wall adjacent said fifth ports and intermediate said third port and said pair of fifth ports.

13. The apparatus as defined by claim 11 wherein said opposing second ports in said side walls comprise a pair of relatively large elongated ports running substantially parallel to said rear wall and below said generally circular first ports.

14. The apparatus as defined by claim 5 wherein said at least one transport mechanism additionally comprises:
an elongated pivoted member rotatably supporting said drive sprocket, said pivoted member being adapted to arcuately move said drive sprocket to engage and retract from said storage medium; first gear means mounted on said pivoted member; second gear means mounted on said actuator means and being operable to mesh with said first gear means by movement of said actuator means in a first direction to rotate said drive sprocket into engagement with said storage medium.

15. The apparatus as defined by claim 14 wherein said pivoted member and said actuator means respectively include mutually engageable means for unmeshing said first and second gear means upon movement of said actuator means in said first direction a predetermined distance whereby said driving means for said drive sprocket thereafter solely supplies power thereto for selectively transporting said storage medium past said third port.

16. The apparatus as defined by claim 14 wherein said first and second gear means comprises a pinion and rack gear assembly.

17. The apparatus as defined by claim 14 wherein said first gear means comprises a pinion gear and said second gear means comprises a rack and wherein said actuator means includes an inclined cam surface for pivoting said drive sprocket into engagement with said storage medium.

18. The apparatus as defined by claim 5 wherein said tension means includes a pair of mutually opposing roller means respectively mounted on first and second mutually movable support means coupled to said actuator means, said support means being operable to move said pair of roller means into contact with opposite surfaces of said storage medium by movement of said actuator means in said first direction and out of contact therewith by movement in a second direction.

19. The apparatus as defined by claim 18 wherein said first and second support means comprise respective first and second scissor type elements operable by first and second cam means, said first cam means being operable to engage said scissor element by movement of said actuator means in said first direction to close said scissor elements and bring said roller means into contact with said opposite surfaces of said storage medium and thereby tension said storage medium, said second cam means being operable by movement of said actuator means in said second direction to cause said scissor element to open and thus cause said roller means to move out of contact with said storage medium.

20. The apparatus as defined by claim 19 wherein one of said scissor elements is locatable in said second port and additionally includes pressure pad means attached thereto for contacting and thereby further tensioning said storage medium.

21. The apparatus as defined by claim 19 wherein said scissor elements additionally include opposing radiant energy emitting and sensing means being coupled together by said signal path of said at least one fourth port for counting said sprocket holes and said one or more reference holes in said storage medium.

22. The apparatus as defined by claim 5 wherein said at least one elongated slot comprises a pair of elongated slots and said storage medium hold down means comprises a pair of elongated pivoted arcuate elements coupled to said actuator means and being pivoted downwardly to engage the outer edges of said storage medium through said pair of elongated slots by movement of said actuator means in said first direction.

23. The apparatus as defined by claim 22 wherein said elongated arcuate elements comprise a pair of claws having contact surface portions which are curved to contact the storage medium in the region of engagement of said drive sprocket.

24. The apparatus as defined by claim 5 wherein said means for moving said read/write head includes a computer controlled stepper motor, means for supporting and moving said read/write head laterally across said storage medium at said third port of said cartridge, and means coupling said stepper motor to said read/write head for selectively positioning said read/write head adjacent said recording medium.

25. The apparatus as defined by claim 24 wherein said coupling means comprises an anti-backlash coupling means.

26. A drive unit for selectively driving and transporting an elongated information storage medium in a random access data storage system, comprising:
a housing containing a pair of identical storage medium transport mechanisms for selectively driving and transporting two separate storage mediums, each said transport mechanism including actuator means, a single drive sprocket being movable by said actuator means and including means to engage said storage medium with a forward rotational motion for preventing damage to said storage medium when contact is initially made therewith, storage medium tensioning means operable by said actuator means to engage and tension said storage medium in synchronism with the engagement of said drive sprocket with said storage medium, storage medium hold down means operable by said actuator means to contact and hold said storage medium against said drive sprocket in synchronism with the engagement of said drive sprocket with said storage medium, said housing additionally including a single read/write head and stepper motor drive assembly coupled to said read/write head for selectively moving said read/write head on command transversely back and forth between said pair of transport mechanisms for selectively accessing one of said two storage mediums, a single drive motor for selectively powering the drive sprocket of said transport mechanisms one at a time, and coupling means alternately enabled by said means coupling power to said read/write assembly for coupling said single drive motor to said drive sprocket when said read/write head is in the vicinity of the storage medium to which it is engaged.

27. The drive unit as defined by claim 26 and additionally including means intercoupling said drive sprocket, said tensioning means, and said storage medium hold down means of each said transport mechanism for causing said tensioning means and said storage medium hold down means to contact the respective storage medium following engagement of said storage medium by the respective drive sprocket.

28. The drive unit as defined by claim 27 wherein said means coupling said drive sprocket, said tensioning means and said storage medium hold down means of each said transport mechanism comprises a mechanical linkage coupled to said actuator means.

29. The drive unit as defined by claim 27 and wherein said tensioning means of each said transport mechanism comprises a pair of opposing roller means respectively mounted on a pair of mutually movable elements operating to cause said roller means to contact opposite sides of the respective storage medium upon the engagement of said drive sprocket with the respective storage medium.

30. The drive unit as defined by claim 29 wherein said pair of movable elements comprise a pair of pivoted links connected together intermediate their ends, said links including means connected to said actuator means for operating said links to cause said roller means to contact opposite sides of said storage medium when said drive sprocket is in engagement with said storage medium and retracting said roller elements from said storage medium when said drive sprocket disengages said storage medium.

31. The drive unit as defined by claim 27 wherein said storage medium hold down means comprises a pair of pivotally mounted claws coupled to said actuator means and being operable to pivot into contact with the outer edges of said storage medium when said drive sprocket engages said storage medium and pivots out of contact therewith when said drive sprocket disengages said storage medium.

32. The drive unit as defined by claim 26 wherein said coupling means includes respective drive belts coupled between said single drive motor and said drive sprocket of each said transport mechanism and additionally including respective belt tensioning means for transferring power from said drive motor to the respective drive sprocket, and means coupled to said belt tensioning means for tensioning said drive belt in synchronism with the read/write head being positioned adjacent the respective storage medium.

33. The drive unit as defined by claim 32 wherein said stepper motor drive assembly includes anti-backlash coupling means coupling said stepper motor to said read/write head.

34. The drive unit as defined by claim 33 wherein said anti-backlash coupling means comprises an anti-backlash drive chain.

35. The drive unit as defined by claim 34 and additionally including cam means coupled to said drive chain and cam follower means coupled to said drive belt tensioning means, said cam means and said cam follower means being operable to impart a motion to said belt tensioning means in accordance with the operation of said drive chain.

36. Data storage apparatus for use in a random access data storage system comprising:
a cartridge, a continuous length of elongated storage medium located in said cartridge, said storage medium having a row of sprocket holes along each side thereof, as well as one or more reference holes selectively located in relation to said sprocket holes, said cartridge having a pair of relatively large opposing side walls and a plurality of relatively smaller intermediate end walls, at least one of said side walls having a port for receiving drive means therein for transporting said storage medium within the cartridge and at least one other port for receiving storage medium tensioning means therein, said tensioning means further including photo-optical signalling means for counting said sprocket holes and said reference holes in said storage medium, both said cartridge side walls having raised inner side surface portions being structured to define a guide path for said storage medium along the inner surface of one of said end walls as well as an enclosed storage area for said storage medium, said one end wall having another port for accessing a portion of said storage medium in said guide path by an external selectively positioned read/write head, and at least one still another port located in said end wall for providing a signal path for said photo-optical signalling means.

37. Data storage apparatus for use in a random access data storage system comprising:

a cartridge, a continuous length of elongated data storage medium located in said cartridge, said medium having a series of holes selectively located therein for determining a start position of said storage medium and for determining a predetermined data sector of a plurality of data sectors along the length of said storage medium, said cartridge further having a pair of relatively large opposing side walls and an intermediate top and bottom wall and an intermediate front and rear wall, said side walls having respective opposing first ports for selectively receiving drive means therein for transporting said storage medium within the cartridge and respective opposing second ports for receiving storage medium tensioning means therein, both said side walls having raised inner side surface portions defining an interior guide path for said storage medium along the inner surface of said intermediate walls as well as an enclosed area for said storage medium, one intermediate wall selected from said front and rear walls having a third port for accessing a portion of said storage medium in said guide path by a read/write head, a pair of fourth ports located in said selected intermediate wall adjacent said third port and toward the outer edges of said intermediate wall for receiving storage medium tensioning means, a pair of fifth ports in relatively close proximity to said first ports at the corner joining said selected intermediate wall and a wall selected from said intermediate top and bottom wall for receiving external hold down means for said storage medium at the location of said drive means, and a pair of sixth ports in said selected intermediate wall between said fourth ports and said third port for providing a signal path for counting said holes in said storage medium.

38. The apparatus as defined by claim 37 wherein said storage medium comprises an endless loop of magnetic storage medium and wherein said series of holes comprise a row of sprocket holes along each side thereof as well as one or more reference holes selectively located in relation to said sprocket holes for determining said start position and said plurality of data sectors.

39. The apparatus as defined by claim 38 wherein said intermediate wall joining said selected intermediate walls comprises a curved wall portion and wherein said pair of fifth ports comprises a pair of relatively thin elongated slots in said curved wall portion at the outer edges thereof.

40. The apparatus as defined by claim 39 wherein said pair of elongated slots located in said curved intermediate wall portions are located adjacent said sprocket holes and on the outside thereof along the edges of said storage medium.

41. The apparatus as defined by claim 38 wherein said storage medium comprises an endless loop of 35 millimeter film.

* * * * *